(12) United States Patent
Mereddy

(10) Patent No.: US 11,641,325 B2
(45) Date of Patent: May 2, 2023

(54) DYNAMIC QOS CONTROLLER

(71) Applicant: CHARTER COMMUNICATIONS OPERATING, LLC, St. Louis, MO (US)

(72) Inventor: Sandeep Reddy Mereddy, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/937,057

(22) Filed: Jul. 23, 2020

(65) Prior Publication Data
US 2022/0029922 A1  Jan. 27, 2022

(51) Int. Cl.
*H04L 29/08* (2006.01)
*H04L 47/24* (2022.01)
*H04L 41/16* (2022.01)
*H04L 41/0816* (2022.01)

(52) U.S. Cl.
CPC .......... *H04L 47/24* (2013.01); *H04L 41/0816* (2013.01); *H04L 41/16* (2013.01)

(58) Field of Classification Search
CPC .................................................... H04L 47/24
See application file for complete search history.

(56) References Cited

U.S. PATENT DOCUMENTS

| | | | |
|---|---|---|---|
| 9,374,281 B2 | 7/2016 | Dasgupta et al. | |
| 2015/0195185 A1* | 7/2015 | Dasgupta | G06N 5/025 370/252 |
| 2016/0285704 A1* | 9/2016 | Gasparakis | H04L 41/142 |
| 2020/0177671 A1* | 6/2020 | Tofighbakhsh | H04L 67/12 |
| 2021/0258230 A1* | 8/2021 | Tormasov | H04L 41/147 |

* cited by examiner

*Primary Examiner* — Adnan M Mirza
(74) *Attorney, Agent, or Firm* — Meagher Emanuel Laks Goldberg & Liao, LLP

(57) ABSTRACT

Various embodiments comprise systems, methods, architectures, mechanisms and apparatus for controlling Quality of Service (QoS) within a service provider network by retrieving from the network QoS related data, processing the retrieved QoS related data via one or more time series prediction algorithm to determine QoS prediction data, and responsively generating network management or configuration commands adapted to ensure continued services delivery in accordance with QoS requirements.

30 Claims, 2 Drawing Sheets

DYNAMIC QOS CONTROLLER

FIELD OF THE DISCLOSURE

The present disclosure generally relates to communications network and, in particular, to maintaining quality of service (QoS) in a communications network.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Current network management systems such as those used within the context of cable television systems, telecommunications providers and the like provide various services to their customers in accordance with Quality of Service (QoS) requirements as defined by respective Service Level Agreements (SLAs). The required service levels are maintained by broadly monitoring network performance, capacity, utilization levels and the like and manually determining whether sufficient network capacity exists and deciding to build out additional capacity if such expense seem warranted.

While manual decision regarding capacity upgrades or build-outs are useful in the aggregate, this technique does not timely respond to rapid changes in as-delivered QoS levels experienced by customer due to numerous factors beyond the broad notion of "adequate capacity" in the network.

SUMMARY

Various deficiencies in the prior art are addressed by systems, methods, architectures, and services automated QoS controller functionality via a network manager or QoS controller implemented with service provider equipment associated with a managed network. The QoS controller functions generally comprise (1) retrieving from the network QoS related data (e.g., retrieving QoS queue utilization data from router interfaces network via SNMP, streaming telemetry and the like), (2) processing the retrieved QoS related data via one or more time series prediction algorithm (e.g., ARIMA) to determine QoS prediction data (e.g., predicted future router interface QoS queue utilization levels based retrieved QoS data), and (3) responsively generating network management or configuration commands adapted to ensure continued services delivery in accordance with QoS requirements (e.g., commands to dynamically change router interface queue bandwidth based on predicted future router interface QoS queue utilization levels). Various embodiments may also provide a graphical user interface (GUI) giving operator personnel visibility of current and predicted router interfaces QoS queue utilization levels within a single screen such that automated processes for meeting SLA requirements may be monitored and augmented if desired.

A method of controlling Quality of Service (QoS) in a service provider network according to an embodiment comprises: receiving, from each of a plurality of routers within the service provider network, current utilization level data for each router interface queue supporting a client service; receiving topology data indicative of the provider equipment (PE) currently provisioned to support client services within the service provider network; determining, for each router interface queue, a respective required QoS; using a machine learning model to predict whether any of the router interface queue utilization levels will exceed a threshold utilization level; determining, for at least a portion of the router interface queues predicted to exceed the threshold utilization level, one or more network configuration updates operative to constrain router interface queue utilization levels to less than the threshold utilization level; and transmitting a message configured to invoke the one or more network configuration updates or service configuration updates.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
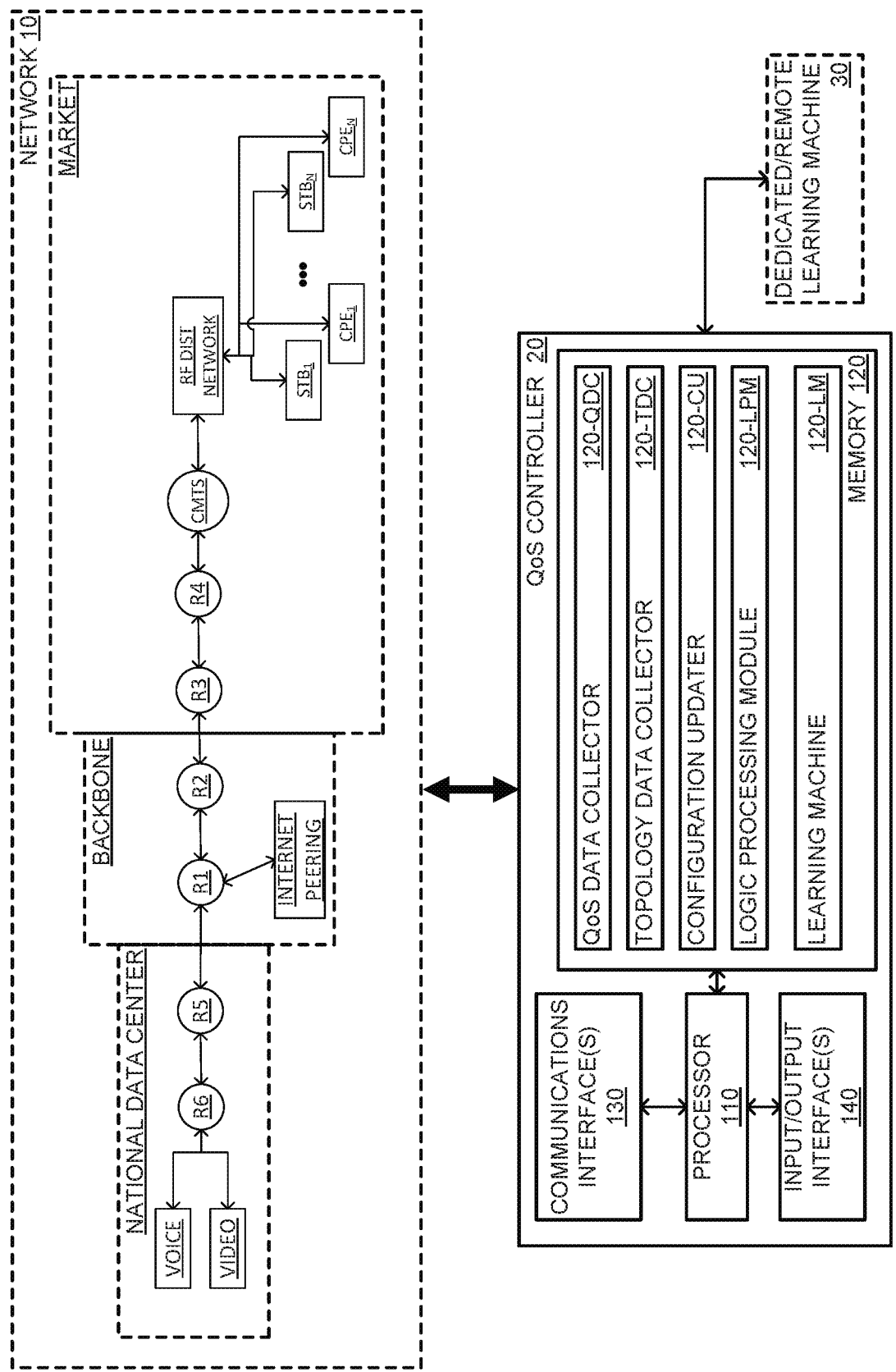
FIG. 1 depicts a high-level block diagram of a QoS controller according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide automated QoS controller functionality via a network manager or QoS controller implemented with service provider equipment associated with a managed network. The QoS controller functions generally comprise (1) retrieving from the network QoS related data (e.g., retrieving QoS queue utilization data from router interfaces network via SNMP, streaming telemetry and the like), (2) processing the retrieved QoS related data via one or more time series prediction algorithm (e.g., ARIMA) to determine QoS prediction data (e.g., predicted future router interface QoS queue utilization levels based retrieved QoS data), and (3) responsively generating network management or configuration commands adapted to ensure continued services delivery in accordance with QoS requirements (e.g., commands to dynamically change router interface queue bandwidth based on predicted future router interface QoS queue utilization levels).

Various embodiments may also provide a graphical user interface (GUI) giving operator personnel visibility of current and predicted router interfaces QoS queue utilization levels within a single screen such that automated processes for meeting SLA requirements may be monitored and augmented if desired.

FIG. 1 depicts a high-level block diagram of a QoS controller according to an embodiment. Specifically, FIG. 1 depicts a computing device 20 configured to perform various QoS controller functions associated with a network 10, or portion thereof (such as depicted). The QoS controller functions discussed herein may be implemented as a discrete functional entity, separate from other management entities in or associated with the network. The QoS controller functions discussed herein may be implemented as a functional subset or portion of functions associated with a Network Manager. Further, the QoS controller functions discussed herein may be implemented at provider equipment (PE) configured to implement a QoS controller, a Network Manager including a QoS controller function, at PE that is separate and/or remote from PE configured to implement a Network Manager, and so on.

FIG. 1 depicts a portion of a network 10; namely, a portion of an Internet Service Provider (ISP) network in which a National Data Center (NDC) provides various network and communication services (e.g., voice, video, data, Internet of things and the like) via a backbone network to home or business customers coupled to the backbone network via a local/market network (e.g., a local access network).

Referring to FIG. 1, the backbone network is depicted as comprising a pair of Internet peering routers denoted as R1 and R2 (in a non-simplified representation, the backbone network may comprise hundreds or thousands of routers and other types of equipment). The NDC is depicted as including a router denoted as R5 that is operably coupled to backbone router R1, and a router R6 supporting voice and video services and routing these services to the edge router R5. The local/market network is depicted as including a router denoted as R3 that is operably coupled to backbone router R2, and a router R4 supporting voice and video services and routing these services to a cable modem termination system (CMTS) at a headend or hubsite (not shown), which supports the delivery of the voice and video services to set top boxes (STBs) and various other customer premises equipment (CPE) at customer homes or businesses.

Referring to FIG. 1, a computing device 20 comprising a computer server and/or other computing device is depicted as including a processor element 110 (e.g., a central processing unit (CPU) or other suitable processor(s)), a memory 120 (e.g., random access memory (RAM), read only memory (ROM), and the like), a communications interface 130 for communicating with various managed elements within the network 10 (e.g., one or more interfaces enabling the communications of control plane, data plane, QoS-related signaling and the like), and an input/output interface 140 (e.g., GUI delivery mechanism, user input reception mechanism, web portal interacting with remote workstations and so on). Optionally, the computing device 20 communicates with a dedicated/remote learning machine 30.

It will be appreciated that computing device 20 depicted in FIG. 1 provides a general architecture and functionality suitable for implementing the QoS controller functions as described herein.

The communications interface 130 facilitates communications with the network 10 such as receiving QoS-related data from routers, network management entities, provider equipment and the like associated with the network 10, illustratively Layer 3 devices which are generally directed to data aggregation or de-aggregation functions, illustratively core routers, edge routers, CMTS, a Network Switching Center (NSC) Voice and Data Router (such as for multicast video and optionally coupled to a router such as router R4), data center routers, enterprise networking equipment/routers and so on. Generally speaking, any PE useful in providing voice, video, and data services within a service provider network and using various queues/buffers or aggregation mechanisms may benefit from the various embodiments.

The memory 120 is depicted as storing computer instructions executable by the processor 110 to implement various functions associated with the QoS controller, such a QoS data collector 120-QDC, topology data collector 120-TDC, configuration updater 120-CU, logic processing module 120-LPM, learning machine 120-LM, and various other programs and databases (not shown). The various functions will be described below, and with respect to FIG. 2.

It is noted that the various functions are depicted herein for convenience as separate modules stored within the memory 120 and executable by the processor 110. However, more, fewer, and/or different modules stored within memory 120 may be used to implement the various functions as described herein with respect to the embodiments.

Generally speaking, the various embodiments provide a QoS controller and/or QoS controller function configured to automatically receive and process QoS-related data, topology data, and configuration data associated with the various PE of network 10 (much of with is not shown in FIG. 1). For simplicity, the QoS controller function will be described with respect to monitoring and updating PE associated with multiple instances of a local/market network or access network, where each instance has a finite amount of capacity and is capable of serving a finite number of customers.

Figure 2:
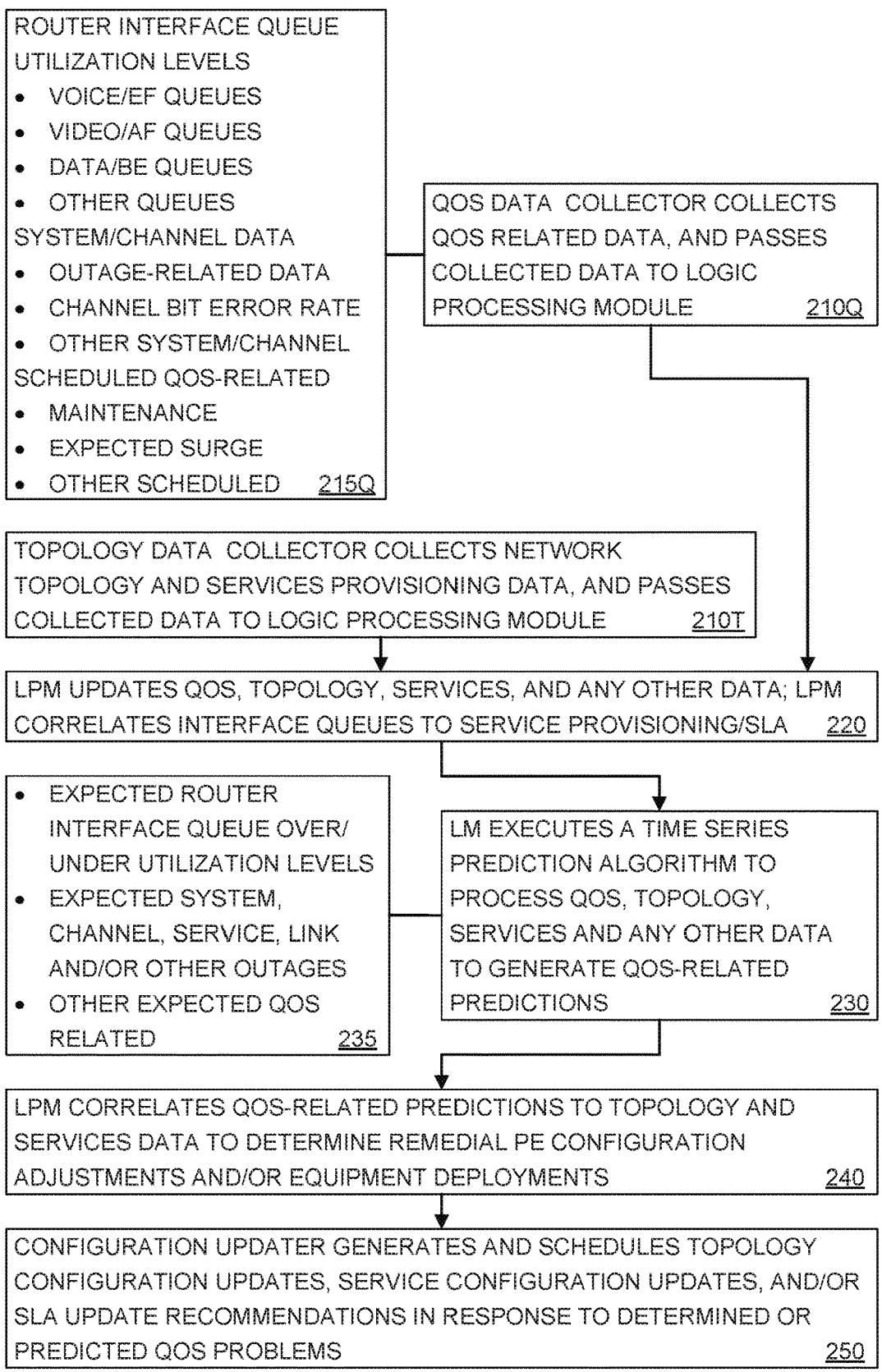
FIG. 2 depicts a flow diagram of a method according to an embodiment.

FIG. 2 depicts a flow diagram of a method according to an embodiment. In particular, FIG. 2 depicts a method 200 suitable for use by, illustratively, the QoS controller 20 described above with respect to FIG. 1.

At step 210Q, the QoS data collector 120-QDC collect QoS-related data and passes the collected data to the logic processing module 120-LPM. Referring to box 215Q, QoS-related data may comprise router interface queue utilization levels, such as from expedite forwarding (EF) queues normally used for voice, assured forwarding (AF) queues normally used for video, best effort (PE) queues normally used for other data, and/or other queues, queuing structures or combinations thereof. QoS-related data may also comprise system/channel data associated with QoS, such as outage related data, channel bit error rate data and/or other system/channel performance data/metrics indicative of QoS. QoS-related data may also comprise data pertaining to scheduled maintenance, expected surges in traffic, expected surges in customer connections and/or other scheduled or predicted events that impact QoS. That is, at step 210Q, current utilization level data for each router interface queue supporting a client service is received from each of the plurality of routers within the service provider network. In some embodiments, only data pertaining to queues supporting expedite forwarding (EF) services is received or further processed. In some embodiments, only data pertaining to queues supporting EF services or assured forwarding (AF) services is received or further processed.

For example, as depicted herein each of the head-end routers R3 and R4 comprises a plurality of router interfaces, and each router interface includes a plurality of buffering or queuing structures through which customer service data flows. These buffering/queuing structures are configured to support buffering/queuing operations associated with customer service data flows, such as voice or video service data flows. As the number of customer service data flows through a particular router interface increases, the utilization level of the respective buffers/queuing structures also increases. If the percentage utilization level of a buffer or queuing structure exceeds 100%, then the QoS associated with customer service data flows through that buffer or queuing structure is degraded due to dropped packets, increased bit error rate and the like. While forward error correction (FEC) may be used to compensate for some of this service degradation, service level agreement (SLA) requirements may still be unmet.

At step 210T, the topology data collector 120-TDC collects network topology and services provisioning data and passes the collected data to the logic processing module 120-LPM. The network topology data defines the provider network in terms of the deployed PE equipment, the various communication channels/links therebetween and other relevant data defining the topology of the service provider network. Network topology data may also include $3^{rd}$ party network connections (e.g., networks external to, or included within, the service provider network but managed by a third party), $3^{rd}$ party networking equipment and channels/links thereto if available and so on. Services provisioning data may include specific "nailed up" communications links, network routing/addressing data, bandwidth allocation and migration data, specific links/channels created in response to SLA commitments, QoS requirements for services delivery over the provisioned network topology as defined in SLAs and so on.

It is contemplated that steps 210Q and 210T operate in a substantially contemporaneous manner to continually and independently collect and provide to the logic processing module 120-LPM respective QoS-related data and topology data.

At step 220, the logic processing module 120-LPM updates QoS, topology, services, and/or any other collected data associated with the network 10. In various embodiments, the LPM correlates queue utilization level data with service provisioning data and/or SLA requirements.

At step 230, the learning machine 120-LM executes a timeseries prediction algorithm to process the QoS, topology, services, and any other collected data associated with the network 10 to generate QoS-related predictions associated with network such that preventative action may be taken. Referring to box 235, such QoS-related predictions may comprise expected over-utilization or under-utilization of one or more router interface queuing structures, expected outages at various system, channel, service, link or other portions of the network, as well as other expected conditions which may negatively impact QoS levels of services provided to customers in the future.

That is, the machine learning model uses current and historic queue utilization level data for each router interface queue supporting a client service, and the required QoS of the respective supported client service, to predict if (and when) the router interface queue utilization level will exceed a threshold utilization level deemed to be inconsistent with meeting QoS requirements. It is noted that the threshold utilization level may differ between different types of queues (e.g., EF, AF, BE and so on), queues of different sizes (e.g., larger queues may tolerate a higher percentage threshold level and still maintain QoS), queues supporting primary services rather than those supporting backup services, and so on. The threshold utilization levels will be expressed herein as a percentage level (e.g., 80%, 90%, 95%, 98%, 100%), however other measures of utilized or remaining queue capacity may also be used.

The machine learning model may also use network topology data indicative of the specific provider equipment (PE) supporting those client services supported by the router interface queues in forming the various predictions.

At step 240, the logic processing module 120-LPM correlates the QoS-related predictions to the topology and service data to determine remedial provider equipment configuration adjustments and or equipment deployments.

For example, if a monitored QoS queue on router R4 is at 90% utilization level, then an increase of bandwidth allocation for EF/AF streams in the queue may be made by reallocating best effort bandwidth/streams to another interface queue. Alternatively, one or more additional interfaces may be allocated to the EF/AF streams associated with the monitored queue. If no additional interfaces are available, then an upgrade of the router itself may be invoked. Alternatively, a migration of traffic from the router supporting the monitored QoS queue may be implemented to move the traffic to another router (load balancing). Other rerouting or changes in processing of the traffic may also be implemented to improve QoS. Further, these various changes, updates, migrations and so on may be made individually or in combination.

At step 250, the configuration updater automatically generates and schedules topology configuration updates, service configuration updates, and/or SLA update recommendations in response to determined or predicted QoS problems. For example, one or more network configuration updates may be generated, such as configuration updates to existing PE within the service provider network, rerouting of services among PE within the service provider network, increasing capacity such as by deployment of additional PE within the service provider network, load balancing within the service provider network and/or including the use of $3^{rd}$ party PE in 3rd party networks (i.e., overflow networks). It is noted that the timelines associated with the predictions enable the rollout of topology configuration updates, service configuration updates, and/or SLA update recommendations in a scheduled manner that does not involve emergency-level efforts/costs.

Thus, the various functions, methodologies, databases or portions thereof (including associated data structures) may be stored on a computer readable storage medium (e.g., RAM memory, magnetic or optical drives and the like) from which they may be retrieved and executed/implemented.

It will be appreciated that the functions depicted and described herein may be implemented in hardware or in a combination of software and hardware, e.g., using a general purpose computer, one or more application specific integrated circuits (ASIC), or any other hardware equivalents. In one embodiment, computer instructions are loaded into memory 120 and executed by processor(s) 110 to implement the various functions as discussed herein. The various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method of controlling Quality of Service (QoS) in a service provider network, comprising
receiving, from each of a plurality of routers within the service provider network, current utilization level data for each router interface queue supporting a client service;
receiving topology data indicative of the provider equipment (PE) currently provisioned to support client services within the service provider network;
determining, for each router interface queue, a respective required QoS;
using a machine learning model to predict whether any of the router interface queue utilization levels will exceed a threshold utilization level;
determining, for at least a portion of said router interface queues predicted to exceed the threshold utilization level, one or more network configuration updates operative to constrain router interface queue utilization levels to less than the threshold utilization level; and
transmitting a message configured to invoke the one or more network configuration updates or service configuration updates;
wherein the machine learning model uses current and historic utilization level data for each router interface queue supporting a client service and the required QoS of the respective supported client service;
wherein the machine learning model uses network topology data indicative of the provider equipment (PE) supporting the client services supported by the router interface queues.

2. The method of claim 1, wherein the portion of said router interface queues predicted to exceed the threshold utilization level comprises those router interface queues supporting expedite forwarding (EF) services.

3. The method of claim 2, wherein the portion of said router interface queues predicted to exceed the threshold utilization level further comprises those router interface queues supporting assured forwarding (AF) services.

4. The method of claim 1, wherein router interface queues supporting expedite forwarding (EF) services are associated with a first threshold utilization level, and router interface queues supporting assured forwarding (AF) services are associated with a second threshold utilization level.

5. The method of claim 1, wherein the one or more network configuration updates comprise a configuration update to existing PE within the service provider network.

6. The method of claim 1, wherein the one or more network configuration updates comprise at least one of a configuration update to existing PE within the service provider network and a deployment of additional PE within the service provider network.

7. The method of claim 1, wherein determining a required QoS for each router interface queue comprises correlating each router interface queue to a respective QoS requirement in a Service Level Agreement (SLA).

8. A computing device configured to communicate with a service provider network to manage Quality of Service (QoS) of router queues therein, the computing device performing a method, comprising
receiving, from each of a plurality of routers within the service provider network, current utilization level data for each router interface queue supporting a client service;

receiving topology data indicative of the provider equipment (PE) currently provisioned to support client services within the service provider network;

determining, for each router interface queue, a respective required QoS;

using a machine learning model to predict whether any of the router interface queue utilization levels will exceed a threshold utilization level;

determining, for at least a portion of said router interface queues predicted to exceed the threshold utilization level, one or more network configuration updates operative to constrain router interface queue utilization levels to less than the threshold utilization level; and transmitting a message configured to invoke the one or more network configuration updates or service configuration updates;

wherein the machine learning model uses current and historic utilization level data for each router interface queue supporting a client service and the required QoS of the respective supported client service;

wherein the machine learning model uses network topology data indicative of the provider equipment (PE) supporting the client services supported by the router interface queues.

9. The computing device of claim 8, wherein the computing device comprises a QoS controller implemented at provider equipment (PE) within the service provider network.

10. The computing device of claim 8, wherein the portion of said router interface queues predicted to exceed the threshold utilization level comprises those router interface queues supporting expedite forwarding (EF) services.

11. The computing device of claim 10, wherein the portion of said router interface queues predicted to exceed the threshold utilization level further comprises those router interface queues supporting assured forwarding (AF) services.

12. The computing device of claim 8, wherein router interface queues supporting expedite forwarding (EF) services are associated with a first threshold utilization level, and router interface queues supporting assured forwarding (AF) services are associated with a second threshold utilization level.

13. The computing device of claim 8, wherein the one or more network configuration updates comprise a configuration update to existing PE within the service provider network.

14. The computing device of claim 8, wherein the one or more network configuration updates comprise at least one of a configuration update to existing PE within the service provider network and a deployment of additional PE within the service provider network.

15. The computing device of claim 8, wherein determining a required QoS for each router interface queue comprises correlating each router interface queue to a respective QoS requirement in a Service Level Agreement (SLA).

16. A Quality of Service (QoS) controller, implemented at a computing device configured to communicate with a service provider network, to manage QoS of router queues therein, the QoS controller performing a method, comprising receiving, from each of a plurality of routers within the service provider network, current utilization level data for each router interface queue supporting a client service;

receiving topology data indicative of the provider equipment (PE) currently provisioned to support client services within the service provider network;

determining, for each router interface queue, a respective required QoS;

using a machine learning model to predict whether any of the router interface queue utilization levels will exceed a threshold utilization level;

determining, for at least a portion of said router interface queues predicted to exceed the threshold utilization level, one or more network configuration updates operative to constrain router interface queue utilization levels to less than the threshold utilization level; and transmitting a message configured to invoke the one or more network configuration updates or service configuration updates;

wherein the machine learning model uses current and historic utilization level data for each router interface queue supporting a client service and the required QoS of the respective supported client service;

wherein the machine learning model uses network topology data indicative of the provider equipment (PE) supporting the client services supported by the router interface queues.

17. The QoS controller of claim 16, wherein the portion of said router interface queues predicted to exceed the threshold utilization level comprises at least one of those router interface queues supporting expedite forwarding (EF) services, those router interface queues supporting assured forwarding (AF) services.

18. The QoS controller of claim 17, wherein router interface queues supporting expedite forwarding (EF) services are associated with a first threshold utilization level, and router interface queues supporting assured forwarding (AF) services are associated with a second threshold utilization level.

19. The QoS controller of claim 16, wherein the machine learning model is used to predict over-utilization or under-utilization of router interface queue supporting a client service.

20. The QoS controller of claim 16, wherein the machine learning model is used to predict an expected outage at one or more of a channel, service, and link within the service provider network.

21. The QoS controller of claim 16, wherein the method further comprises determining, in response to a predicted router interface queue utilization level exceeding a threshold utilization level, at least one remedial PE configuration adjustment.

22. The QoS controller of claim 16, wherein the method further comprises determining, in response to a predicted router interface queue utilization level exceeding a threshold utilization level, at least one remedial PE deployment.

23. The method of claim 1, wherein the machine learning model is used to predict over-utilization or under-utilization of router interface queue supporting a client service.

24. The method of claim 1, wherein the machine learning model is used to predict an expected outage at one or more of a channel, service, and link within the service provider network.

25. The method of claim 1, further comprising determining, in response to a predicted router interface queue utilization level exceeding a threshold utilization level, at least one remedial PE configuration adjustment.

26. The method of claim 1, further comprising determining, in response to a predicted router interface queue utilization level exceeding a threshold utilization level, at least one remedial PE deployment.

27. The computing device of claim 8, wherein the machine learning model is used to predict over-utilization or under-utilization of router interface queue supporting a client service.

28. The computing device of claim 8, wherein the machine learning model is used to predict an expected outage at one or more of a channel, service, and link within the service provider network.

29. The computing device of claim 8, wherein the method further comprises determining, in response to a predicted router interface queue utilization level exceeding a threshold utilization level, at least one remedial PE configuration adjustment.

30. The computing device of claim 8, wherein the method further comprises determining, in response to a predicted router interface queue utilization level exceeding a threshold utilization level, at least one remedial PE deployment.

\* \* \* \* \*